July 18, 1933.  K. W. McHOSE  1,918,346
STRUCTURAL MEMBER
Filed Jan. 13, 1930
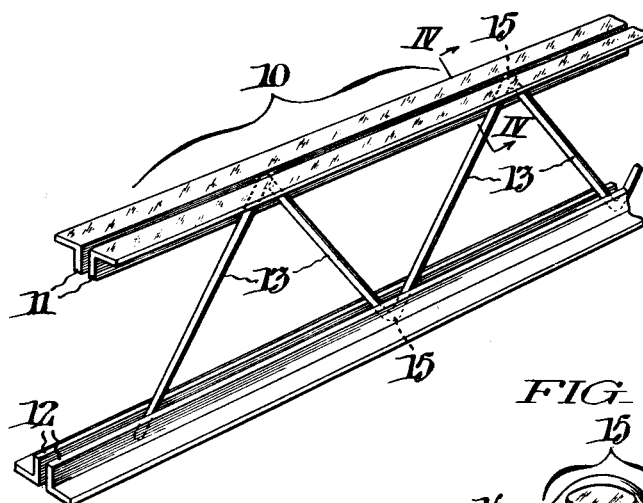
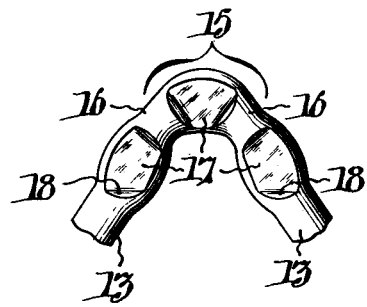
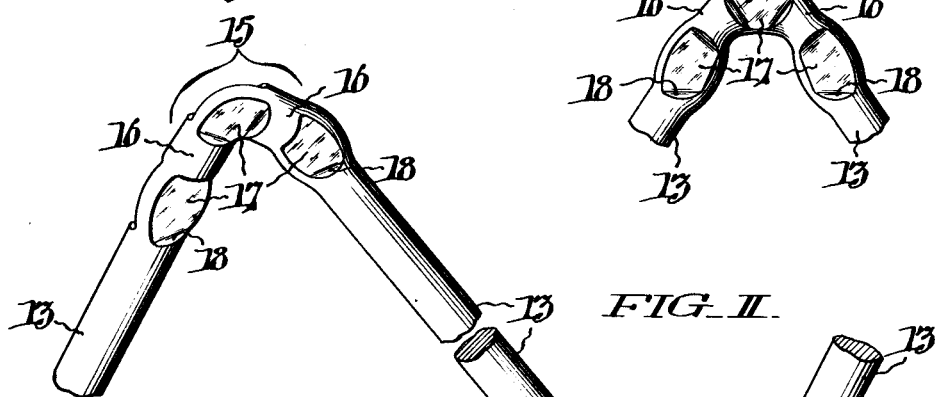
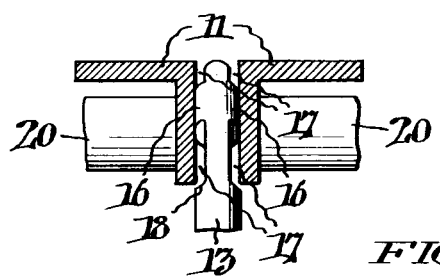
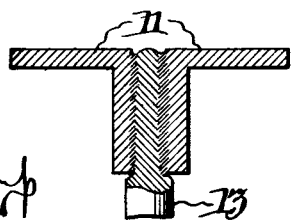
WITNESSES
INVENTOR:
Kern W. McHose,
BY
ATTORNEYS.

Patented July 18, 1933

1,918,346

UNITED STATES PATENT OFFICE

KERN W. McHOSE, OF NARBERTH, PENNSYLVANIA, ASSIGNOR TO McCLINTIC-MARSHALL CORPORATION, A CORPORATION OF PENNSYLVANIA

STRUCTURAL MEMBER

Application filed January 13, 1930. Serial No. 420,363.

My invention relates to a form or type of structural member useful, for example, as a beam or girder, as a column, as a reinforcement for concrete, or as a component of a framework, truss, or other structure. Besides simplicity and lightness of construction in proportion to the strength secured, my invention affords the advantage of great economy and convenience in manufacture as compared with present commercial practice. Other advantages that may be realized through the invention will appear from the description hereinafter.

In the drawing, Fig. I is a perspective view of a structural member conveniently embodying the invention.

Fig. II is a perspective view of a portion of the web member of the construction shown in Fig. I.

Fig. III is a side view of one of the bends of the web member.

Fig. IV shows a cross-section taken approximately on the line IV—IV of Fig. I, with a contact electrode in position ready to make the weld.

Fig. V shows a similar section through the weld.

As shown in Fig. I, the structural member 10 comprises longitudinals 11, 12 interconnected by a "web" consisting of braces or struts 13, arranged diagonally. The longitudinals 11, 12 are double, each consisting of a pair of angle bars arranged back to back, with one pair of flanges turned outward and the other turned toward the web 13. As shown, the braces or struts that form the web 13 are portions of a bar or rod bent in a zig-zag, with its bends 15 located between the flats of the longitudinal bars 11, 11 and 12, 12, and laterally welded to them, preferably by the electric method known as spot welding, or, more particularly, the high pressure electric resistance process.

To facilitate welding the bar 13 and the longitudinals 11, 11 (and 12, 12) to one another in order that the current may be segregated, the bar 13 is provided or formed with lateral projections 16 to afford definite areas of contact with the flat surfaces of the longitudinals 11, 11 (or 12, 12), whereby the current in passing points of contact effects a fusion of metals confined to said definite areas. These projections 16 may be created by forming suitably separated or spaced depressions 17 in the sides of the rod, which may be done by a pressing, stamping, or rolling operation, leaving the portions of the bar 13 between and adjacent the depressions 17 substantially undeformed. As shown in Figs. II and IV, the depressions 17 are formed directly opposite one another in the opposite sides of the rod (as determined by the plane of bending and zig-zag). The depressions 17 merely represent a change in shape of the rod 13, which is here shown as round or cylindrical, not materially affecting its net sectional area or its ultimate strength. However, they need not necessarily be formed all along the bar 13, throughout its entire length, but only at its bends, as in the portions where it is to be bent. In the present instance, there are three depressions 17, 17, 17 to each bend 15 of the rod 13: one depression 17 located at the very apex of the bend, and the other two depressions 17, 17 in the "legs" of the zig-zag a little to either side of the apex. As shown, the lower boundaries 18 of these latter depressions 17, 17 extend in one straight line.

For the welding operation, the zig-zag rod 13 is assembled with the longitudinals 11, 11 (or 12, 12) at either side of its bends 15. To weld the longitudinals 11, 11 to each bend 15, contact terminals 20, 20 are placed against the corresponding flanges of the longitudinals, as shown in Fig. IV, pressing the flanges against the projections 16. Electric current of suitably high amperage is passed between the terminals 20, 20 and through the parts 11, 13, 11, and pressure is applied to the terminals. Thus the parts are brought to a white heat at the points or areas of contact determined by the depressions 17, and the longitudinals 11, 11 are squeezed together on the adjacent portions of the rod 13, flattening them out to a thickness corresponding to that at the depressions 17, as shown in Fig. V, and fusing or welding the rod and the longitudinals together over correspondingly substantial area. As shown in Fig. IV, the edges of the longitudinals 11, 11 fall just above the lower boundaries 18, 18 of the depressions 17, 17, so that the transition from the flattened cross-section of the rod 13 between the longitudinals 11, 11 to the undeformed cross-section outside is not included in the area of fusion and welding.

Besides the obvious simplicity, convenience, and cheapness of manufacture afforded by my construction as above described, there is a further important advantage over present commercial practice, in that only bars of ordinary commercial sections are required as components of my structural member. At present, special welding ridges or "edges" are stamped or rolled in the chord or flange members corresponding to my longitudinals 11, 12, which entails a special operation at the rolling mills. For my construction, standard bars from any rolling mill or large stock of "shapes" can be employed, and the depressions 17 formed in the fabricating shop just before the bars are used, either after they are bent to the required zig-zag, or (in suitable groupings at proper intervals) before bending.

Having thus described my invention, I claim:—

1. The method of fabricating a structural member comprising flat-sided longitudinals interconnected by a continuous zig-zag web element laterally spot-welded to said longitudinals at its bends, which method comprises bending a bar to the required zig-zag and forming lateral depressions in it at each bend, one of which is at the apex and the others in spacial relation to either side of said apex, and pressing the bends against the longitudinals while passing a welding current between the areas intervening said depressions so that transition from the deformed cross-section at such bends to the undeformed cross-section outside thereof is not included in the areas of fusion and welding.

2. As a new article of manufacture, a web component for structural members comprising a continuous bar embodying successive alternating bends with lateral depressions thereat, one of said depressions being located medially of the bend and the others in proximate flanking spacial relation thereto.

3. As a new article of manufacture, a web component for structural members comprising a continuous round-section bar embodying alternating angular bends with lateral depressions thereat, said depressions being formed at opposite sides of the bar with one opposing pair located at the apex of each bend and the others in the legs in spacial relation to either side of said apex.

KERN W. McHOSE.